United States Patent [19]

Minami

[11] Patent Number: 5,014,046

[45] Date of Patent: May 7, 1991

[54] DISPLAY PAGER WITH SUPPLEMENTAL DISPLAY MEANS

[75] Inventor: Yoichiro Minami, Tokyo, Japan

[73] Assignee: NEC Corporation, Tokyo, Japan

[21] Appl. No.: 327,458

[22] Filed: Mar. 22, 1989

[30] Foreign Application Priority Data

Mar. 22, 1988 [JP] Japan ............................ 63-36323[U]

[51] Int. Cl.[5] ......................... G09G 1/06; H04Q 1/30; H04B 1/08

[52] U.S. Cl. ................................ 340/727; 340/311.1; 455/351

[58] Field of Search ................ 340/311.1, 825.44, 716, 340/723, 727, 825.19; 358/238; 455/351, 154, 158; 379/52; D14/191; 40/530, 593; 200/300

[56] References Cited

U.S. PATENT DOCUMENTS

| | | | |
|---|---|---|---|
| 4,132,022 | 1/1979 | Wood, Jr. | 40/530 |
| 4,715,642 | 12/1987 | Dobbs | 40/593 |
| 4,802,241 | 1/1989 | Vickers et al. | 455/351 |
| 4,817,194 | 3/1989 | Andros, Jr. | 455/154 |
| 4,864,754 | 9/1989 | Sangu | 40/593 |

FOREIGN PATENT DOCUMENTS

| | | |
|---|---|---|
| 56-74765 | 6/1981 | Japan . |
| 0087541 | 5/1984 | Japan . |
| 62-286329 | 12/1987 | Japan . |

*Primary Examiner*—Alvin E. Oberley
*Assistant Examiner*—Chanh Nguyen
*Attorney, Agent, or Firm*—Sughrue, Mion, Zinn, Macpeak & Seas

[57] ABSTRACT

A pager includes a display mounted on the front side of a pager housing. On the back side of the housing is mounted a clip which is used for carrying the pager on the user's belt. The display displays a received message and inverts the displayed message in response to a switch signal. The inverted message is reflected at a foldable mirror to produce a noninverted message that the user can see from the upper side of the housing. A switch produces the switch signal to invert the displayed message with the unfolding movement of the foldable mirror.

18 Claims, 3 Drawing Sheets

FIG. 1
PRIOR ART
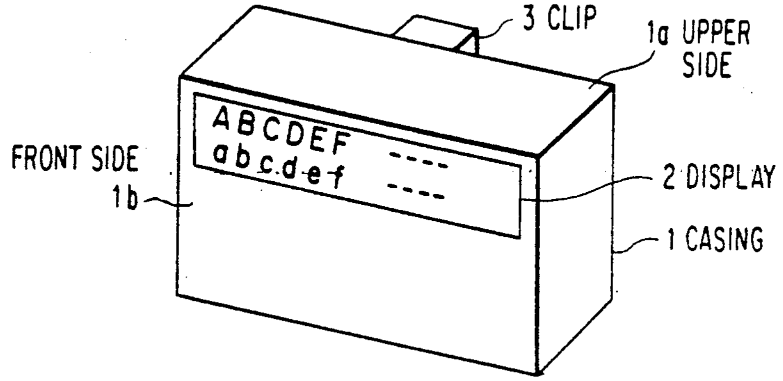
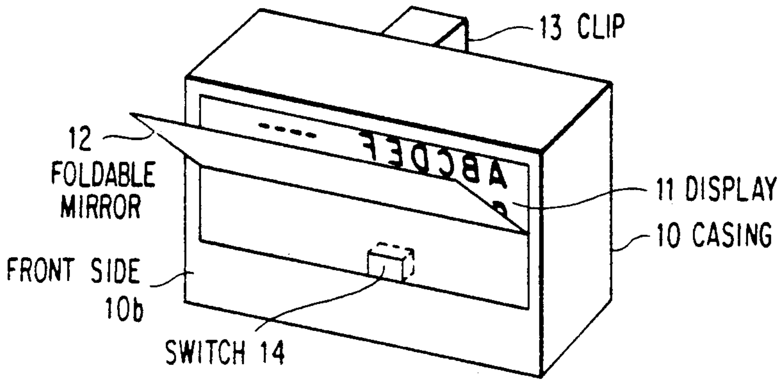
FIG. 2
FIG. 3
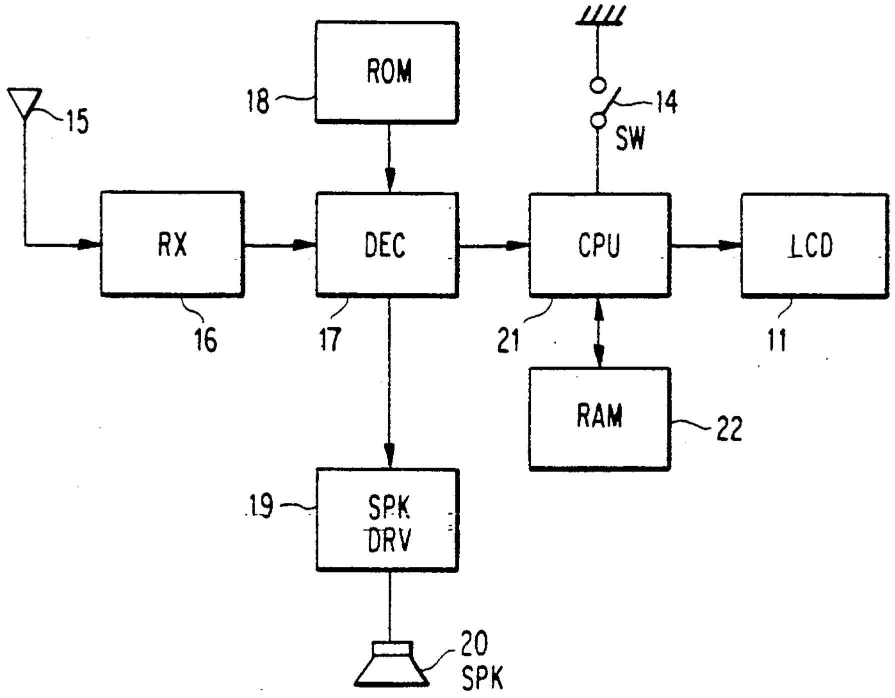

SW 14 OFF

SW 14 ON

DISPLAY PAGER WITH SUPPLEMENTAL DISPLAY MEANS

BACKGROUND OF THE INVENTION

The present invention relates to a paging receiver and, more particularly, to a display pager having a supplemental display means.

A conventional display pager receives a message and displays it on a display thereof. The display can be mounted on any side of the pager housing if the size of displayed messages is not very large. However, if the displayed message is large in size, the size of the display must be big and thus the display can be mounted on only the front of the housing, for that side is of a size wide enough to accommodate a big display. If a pager with a front mounted display is attached to a user's belt by a clip on the back side of the pager housing, the user must detach the pager from his belt to view a displayed message and the pager to his belt. This procedure is cumbersome and may cause excessive wear of the belt clip.

SUMMARY OF THE INVENTION

An object of the present invention is to provide a display pager which eliminates the above-mentioned disadvantage.

Another object of the present invention is to provide a display pager having a supplemental display from which the user can see a message without detaching the pager from his belt.

Yet another object of the present invention is to provide a pager having a display which displays a received message in an inverted manner and a mirror, acting as a supplemental display, which reflects the inverted message to provide the user with a noninverted message display.

According to the present invention, there is provided a paging receiver comprising a display which displays a received message and inverts the message characters to be displayed in response to a switch signal. The paging receiver also comprises a mirror foldably attached thereto which reflects the inverted message to display a message with noninverted characters. The receiver further comprises a switch which is closed and opened in accordance with the movement of the mirror to produce the switch signal.

BRIEF DESCRIPTION OF THE DRAWINGS

The above and other objects, features and advantages of the present invention will become more apparent from the following description referring to the accompanying drawings, in which:

FIG. 1 shows a perspective view of a conventional display pager;

FIG. 2 shows a perspective view of a display pager embodying the present invention;

FIG. 3 shows a block diagram of the display pager shown in FIG. 2;

DETAILED DESCRIPTION OF THE PREFERRED EMBOIDMENTS

Figure 4A:
FIGS. 4A and 4B show examples of messages displayed on a display of the FIG. 2 pager.

To better understand the present invention, a prior art display pager will first be described. In FIG. 1, the pager includes a casing 1, a display 2 and a clip 3. The display 2 is attached to a front side 1*b* of the casing 1. The upper side 1*a* of the casing 1 is not wide enough to accommodate display 2. The pager may be worn on a user's waist belt using the clip 3. To see a message displayed on the display 2, the user removes the pager from his belt. After checking the message, the pager is returned to the belt. This is both cumbersome and may cause excessive wearing of the belt clip 3.

The pager of the invention will now be described with respect to FIG. 2. The pager of FIG. 2 includes a casing, or housing 10, which accommodates the pager electrodes. The pager also includes a display 11, a foldable or movable mirror 12, a clip 13 and a switch 14. The display 11, the mirror 12 and the switch 14 are mounted on the front side of casing 10, while the clip 13 is mounted on the back side thereof.

Figure 5A:
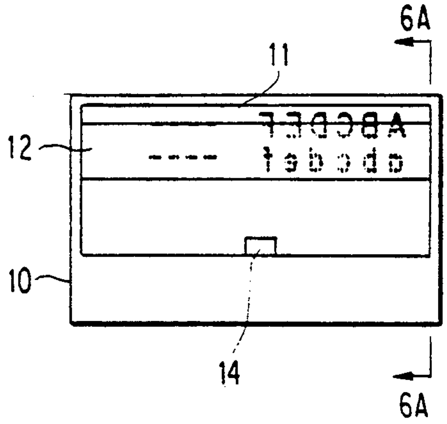
FIGS. 5A and 5B show front and side views, respectively, of the FIG. 2 pager whose foldable mirror is shown unfolded.
Figure 5B:
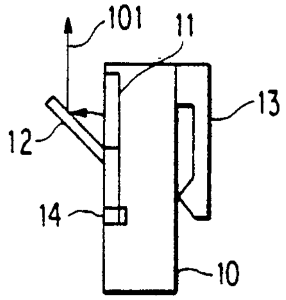
Figure 5C:
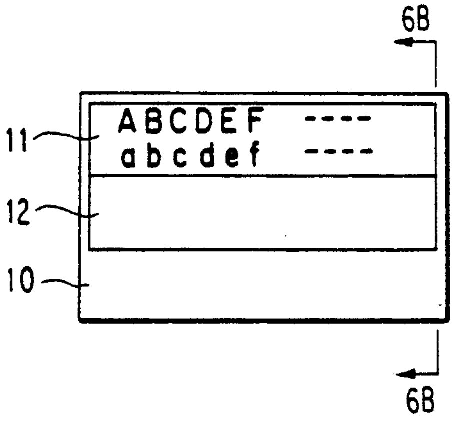
FIGS. 5C and 5D show front and side views, respectively, of the FIG. 2 pager whose foldable mirror is shown folded.
Figure 5D:
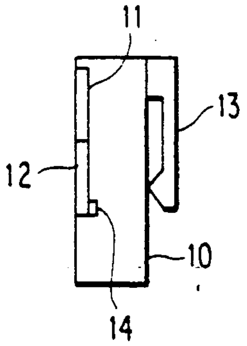
Figure 6A:
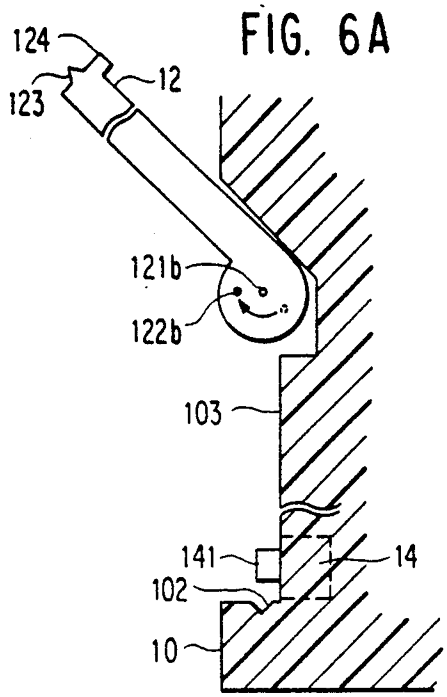
FIGS. 6A and 6B show sectional views of the FIG. 2 pager, taken along lines 6A—6A and 6B—6B of FIGS. 5A and 5C respectively.
Figure 6B:
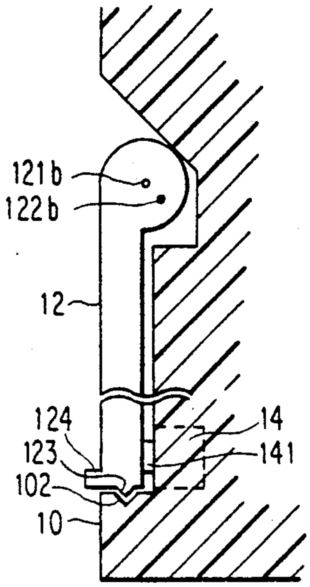

The foldable mirror 12 has two positions best seen in FIGS. 6A and 6B. The mirror position illustrated in FIG. 6B is termed herein the folded position, while the mirror position of FIG. 6A is termed the unfolded position. When the mirror is in the folded position, as shown in FIGS. 5C, 5D and 6B, the switch 14 is open and thus a message is displayed on the display 11 in the normal, noninverted manner. When the mirror 12 is unfolded as shown in FIGS. 2, 5A, 5B and 6A, the switch 14 is closed to cause the display 11 to display a message thereon in an inverted form. Thus, the user can see from the upper side of casing 10 the message reflected on the mirror 12 in normal, noninverted form, and thus the user need not detach the pager from his belt to view the displayed message.

Referring to FIG. 3, the pager includes a receiver section 16 which receives a paging signal through an antenna 15. The receiver section 16 demodulates the received paging signal to produce a demodulated paging number and message or messages which follow the paging number. A decoder 17 compares the demodulated paging number with a paging number which is assigned to the pager and stored in a read-only memory (ROM) 18. If the two paging numbers are identical to each other, the decoder 17 produces an alert signal and provides a control signal and demodulated messages to a central processing unit 21. Upon reception of the alert signal, a speaker driver 19 drives a speaker 20 to generate an alert sound.

Figure 4B:
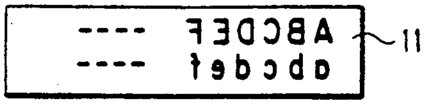

Upon receiving the control signal, CPU 21 decodes the received messages and then stores the decoded messages in a random access memory (RAM) 22. CPU 21 causes a liquid crystal display (LCD) 11 to display the decoded message thereon. A switch 14 is connected to CPU 21 whose switching operation is controlled by movement of the foldable mirror 12 (see FIG. 2). If the mirror 12 is folded, the switch 14 is open and CPU 21 causes the display 11 to normally display a message, as shown in FIG. 4A. If the mirror 12 is unfolded, the switch 14 is closed to produce a switch signal. CPU 21 causes the display 11 to display an inverted message in response to the switch signal, as shown in FIG. 4B. The display inverting technique is well known in the art and therefore a description thereof will be omitted from this specification. Reference is made to Japanese Laid-open (Kokai) application Nos. 74765/81 and 286329/87 for a detailed description of a display inverting technique.

In FIGS. 5A and 5B, the foldable mirror 12 is shown unfolded. Thus, the switch 14 is closed so that a message is displayed on the display 11 in an inverted form. The displayed message is reflected by the mirror 12 as indicated by an arrow 101. The reflected message can be seen, as a normal, noninverted message, from the upper side of housing 10. Accordingly, the user need not remove the pager from his belt to view a displayed message.

In FIGS. 5C and 5D, the foldable mirror 12 is shown folded and thus the switch 14 is open so that a message is normally displayed, i.e., without inversion, on the display 11, which message can be seen from the front side of housing 10.

Figure 8:
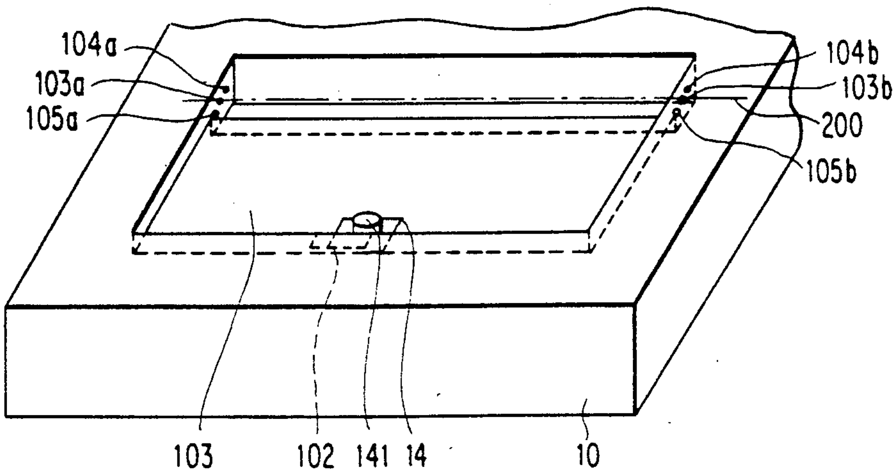
FIG. 8 shows a perspective view of the FIG. 2 pager with the foldable mirror removed.

As shown in FIGS. 6A and 6B, the mirror 12 rotates about an axial hole **121*b* which is engaged with an axial projection 103*b* (see FIG. 8) provided on a wall of a recess 103. In FIG. 6A, the mirror 12 is unfolded and retained in that position by the engagement of a projection 122*b* with a hole 104*b* (FIG. 8). A plunger 141 of the switch 14 is not pressed in that position, so that the switch 14 is closed and thus the display 11 displays an inverted message. In FIG. 6B, the mirror 12 is shown folded and retained in that position by the engagement of a projection 122*b* with a hole 105*b* (FIG. 8) and by the engagement of a projection 123 with a recess 102. The plunger 141 is depressed, so that the switch 14 is open and thus the display 11 displays a noninverted message. A knob 124 is used for unfolding the mirror 12**.

Figure 7:
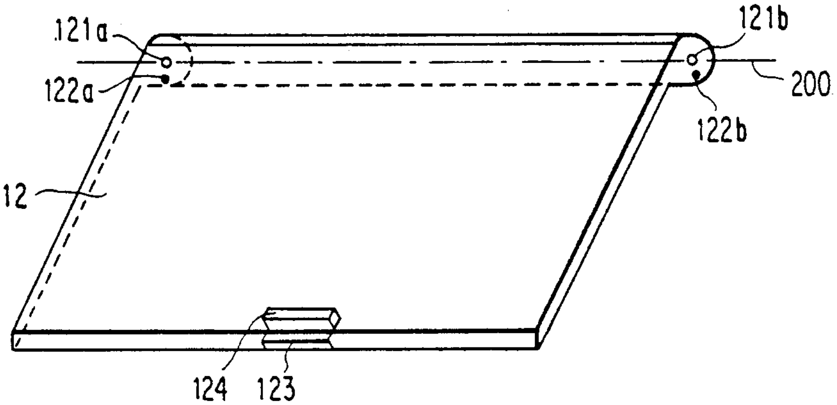
FIG. 7 shows a perspective view of the foldable mirror.

The mirror 12 may be coated with silver or aluminum to provide a mirror surface thereon. As shown in FIGS. 7 and 8, the mirror 12 has axial holes **121*a* and 121*b* for engaging axial projections 103*a* and 103*b*, respectively, so that the mirror 12 rotates about a rotating axis 200. The mirror 12 also has projections 122*a* and 122*b* for engaging either holes 104*a* and 104*b*, and 105*a* and 105*b*, respectively, to retain the mirror 12 in either the unfolded or folded positions. To help retain the mirror 12 in the folded position, the projection 123 engages the recess 102. The switch 14 having the plunger 141 is mounted in the recess 103 of housing 10**.

I claim:

1. A pager comprising:

casing means for accommodating said pager;

display means mounted on the front side of said casing means for displaying a message;

clip means mounted on the back side of said casing means;

mirror means foldably attached to said front side for reflecting a message displayed on said display means;

switch means for providing a switch signal in response to the movement of said mirror means; and control means responsive to said switch signal for causing said display means to produce an inverted display of said message.

2. A pager as claimed in claim 1, wherein said mirror means comprises a plastic member and a member coating said plastic member to provide a mirror surface on said mirror means.

3. A pager as claimed in claim 2, wherein said coating member comprises silver.

4. A pager as claimed in claim 2, wherein said coating member comprises aluminum.

5. A pager as claimed in claim 1, wherein said casing means comprises a recess for accommodating said switch means and said mirror means, said recess having two axial projections, two pairs of holes and a projection receiving recess, and wherein said mirror means comprises two axial holes for engagement with said axial projections, respectively; two projections for engagement with respective two holes of said two pairs of holes; a projection for engagement with said projection receiving recess; and a knob.

6. A pager comprising:

receiving means for receiving and demodulating a paging signal including a paging number and a message to produce a demodulated paging number and message;

store means for storing a paging number assigned to said pager;

comparing means for comparing said demodulated paging number and said paging number assigned to said pager and for, if these paging numbers are identical to each other, providing a control signal and an alert signal;

decoder means responsive to said control signal for decoding said demodulated message to produce a decoded message;

display means for displaying said decoded message and for, responsive to a switch signal, making an inverted display of said decoded message;

moveable mirror means for reflecting said inverted display; and switch means responsive to the movement of said mirror means for providing said switch signal.

7. A pager as claimed in claim 6, wherein said pager further comprises a housing for accommodating said pager, said display means being mounted on the front side of said housing, and wherein said housing has a recess on the front side thereof for accommodating said switch means and said mirror means, and a clip on the back side thereof.

8. A pager as claimed in claim 6, wherein said mirror means comprises a plastic member and a coating member coating said plastic member to provide a mirror surface thereon.

9. A paging receiver comprising:

means for receiving a radio frequency signal including a paging number and a message to produce a received message display means for displaying information corresponding to said received message:

control means for causing said display means to invert the displayed information to produce an inverted display thereon; and reflecting means for reflecting said inverted display.

10. A paging receiver as claimed in claim 9, wherein said control means comprises switch means for producing a switch signal, said control means causing producing a switch signal, said control means causing said display means to produce said inverted display in response to said switch signal.

11. A paging receiver as claimed in claim 10, wherein said reflecting means has a foldable structure, and wherein said switch means produces said switch signal in accordance with the movement of said reflecting means.

12. A paging receiver as claimed in claim 11, wherein said reflecting means comprises a mirror composed of plastics coated with a coating member.

13. A paging receiver as claimed in claim 12, wherein said coating member comprises one of silver and aluminum.

14. A paging receiver as claimed in claim 9, wherein said display means comprises a liquid crystal display.

15. A receiver having a display, comprising:

casing means for accommodating said receiver, said display being mounted on the front side of said casing means;

control means for inverting a display on said display in response to a switch signal;

mirror means foldably mounted on said front side for mirroring the inverted displays; and switch means for producing said switch signal in response to the movement of said mirror means.

16. A receiver as claimed in claim 15 further comprising: receiver means for receiving and demodulating a paging signal to produce a paging number and a message; and decoding means for decoding said message to produce a decoded message, wherein said display comprises means for displaying said decoded message.

17. A method of displaying a message on a pager display, comprising the following steps of:

receiving and demodulating a paging signal including a paging number and a message to produce a demodulated paging number and message;

decoding said demodulated message to produce a decoded message;

displaying said decoded message on said display;

producing a switch signal;

responsive to said switch signal, inverting the display of said decoded message to produce an inverted display on said display; and mirroring said inverted display to produce an inverted display of said inverted display.

18. A method as claimed in claim 17 further comprising the following steps of:

storing a paging number assigned to said pager;

comparing said demodulated paging number and said paging number assigned to said pager and producing an alert signal if these numbers are identical to each other;

responsive to said alert signal, producing alert sound; and storing said decoded message.

* * * * *